June 16, 1925. 1,542,749
C. WEBER
SIGNAL
Filed Feb. 23, 1923  2 Sheets-Sheet 1
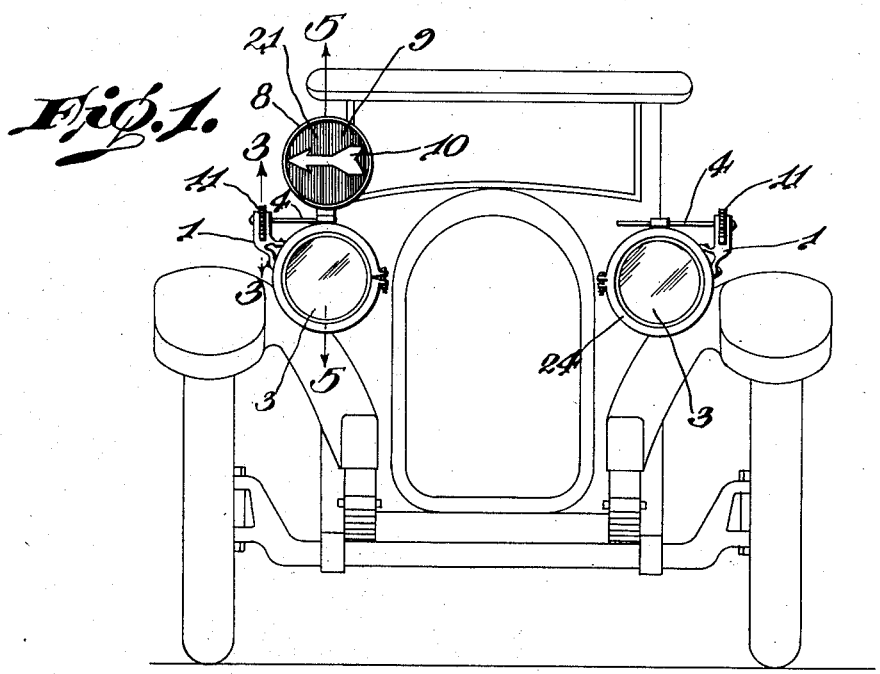
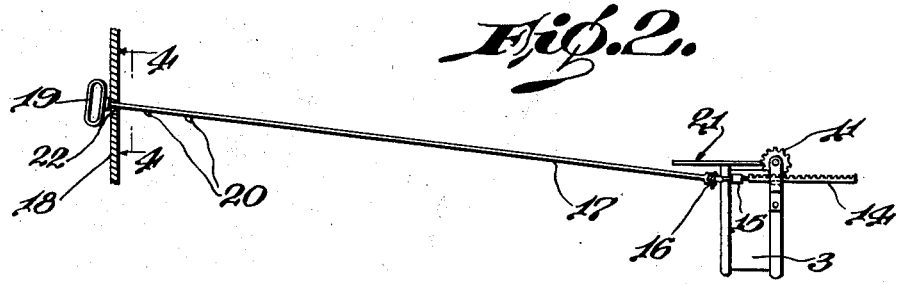
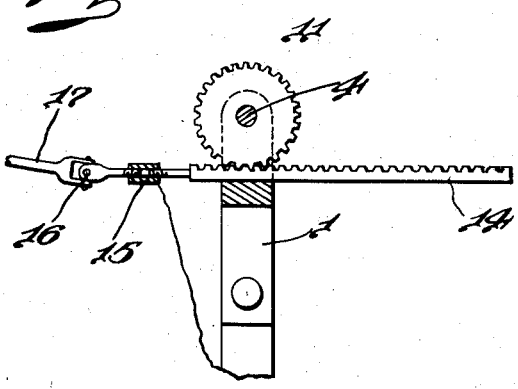
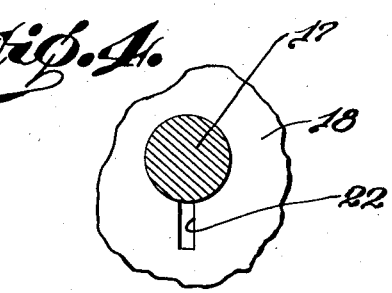
Charles Weber
INVENTOR
BY Victor J. Evans
ATTORNEY June 16, 1925.
C. WEBER
SIGNAL
Filed Feb. 23, 1923
1,542,749
2 Sheets-Sheet 2
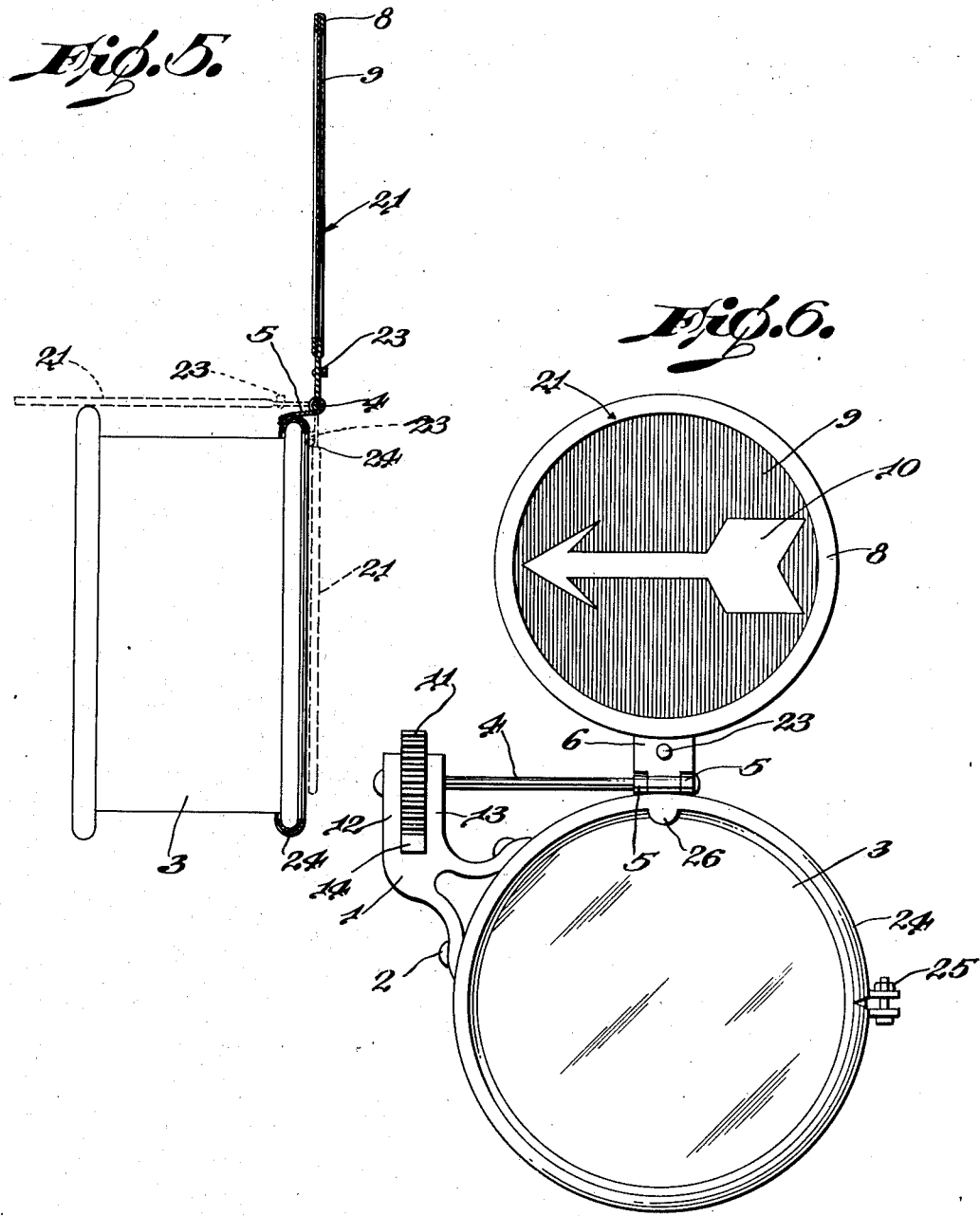

Patented June 16, 1925.

1,542,749

UNITED STATES PATENT OFFICE.

CHARLES WEBER, OF CHICAGO, ILLINOIS.

SIGNAL.

Application filed February 23, 1923. Serial No. 620,758.

*To all whom it may concern:*

Be it known that I, CHARLES WEBER, a citizen of the United States, residing at Chicago, in the county of Cook and State of Illinois, have invented new and useful Improvements in Signals, of which the following is a specification.

This invention relates to signals and more particularly to a signaling device for motor vehicles by means of which the driver or operator of the vehicle may acquaint pedestrians, traffic policemen or approaching motorists of his intentions, such as whether he intends to turn to the right or to the left.

Another object of the invention is to provide a signal mechanism as specified which is simple in construction, and may be quickly and conveniently operated, as well as a signal mechanism which may be attached or applied to cars of existing structures without requiring extensive alterations to the vehicles, and also to provide a signal mechanism which will be highly visible both in the day time and at night.

Other objects of the invention will appear in the following detailed description taken in connection with the accompanying drawings wherein:—

Fig. 1 is a front elevation of a motor vehicle showing the improved signal applied.

Fig. 2 is a fragmentary section through a vehicle illustrating the signal mechanism in side elevation.

Fig. 3 is an enlarged section on the line 3—3 of Fig. 1.

Fig. 4 is an enlarged detail section on the line 4—4 of Fig. 2.

Fig. 5 is an enlarged vertical section through the signal mechanism taken on the line 5—5 of Fig. 1.

Fig. 6 is an enlarged front elevation of the signal structure.

Referring more particularly to the drawings, the improved signal structure comprises brackets 1 one of which is attached in any suitable manner as shown at 2 to each of the head light housings or structures 3 of a motor vehicle. A shaft 4 is rotatably carried by each of the brackets 1 and by suitable bearing ears 5 which are carried by the head light housing. The shaft 4 has a tongue 6 mounted thereon and connected thereto in any suitable manner and the tongue 6 is in turn carried by a circular frame or rim 8. The circular frame or rim 8 has a translucent panel or glass 9 therein, which is preferably red in color and has an arrow 10 which is transparent, formed centrally therein. The pane or panel 9 at the left side of the motor vehicle has the arrow 10 thereon pointing to the left, while the pane at the right side of the vehicle has the arrow thereon pointing to the right.

The tongues 6 are connected to the shaft 4 so that the signals proper which comprises the frames 8, panels 9 and arrows 10 will be swung upon the axis of the shaft 4 as a pivot, upon rotary movement of the shaft. A gear 11 is mounted on the shaft 4 and is positioned between the arms 12 and 13 of the bracket 1. A rack 14 is slidable between the arms 12 and 13 and is connected by means of an adjustable connection 15 and a universal joint 16 to a rod 17. The rod 17 extends rearwardly along the hood of the motor vehicle and passes through the front or instrument board 18. A handle 19 is formed on the rod to facilitate its manual operation and a pair of stop projections 20 are also formed on the rod at spaced points for engagement with the board 18 to hold the rod in adjusted positions.

In operation, during normal travel of the vehicle the signals proper 21 which comprises the frames 8 and panels or panes 9 normally lie in horizontal positions rearwardly of the shafts 4, as clearly shown in Fig. 2 of the drawings and in the day time, when it is the intention of the motorist to turn to the left or to the right, he will move the rod 17 connected to the shaft 4 at either the right or left of the machine depending upon the direction which he intends to take, and move it until the first projection 20 engages through the opening 22 and against the board 18 at which time the signal structure 21 will be supported in a vertical position as shown in Figs. 1, 5 and 6, permitting it to be visible to pedestrians in front of the motor vehicle, and also to traffic policemen or approaching motorists. At night time, the rod 17 is moved so that the second projection 20 will engage the board 18 which moves the signal mechanism 21 downwardly in front of the head light, as shown in dotted lines in Fig. 5 of the drawings permitting the light rays from the lamp or head light to shine through the signal mechanism 21 and render it highly visible. A stop pin 23 is carried by the tongue 6 and is rotatable to engage the frame 24, to limit the downward movement of the signal 21.

In the drawings, the brackets 1 and bearings 5 are shown as carried by an attaching frame 24 which is adapted to be mounted about the front bead of the lamp or head light structure 3 and clamped thereon by means of clamping bolts 25. A tongue or projection 26 is formed on the attaching or clamping frame 24 in position to be engaged by the stop pin 23.

From the foregoing description taken in connection with the accompanying drawings it will be apparent, that the improved signaling mechanism may be applied to motor vehicles of existing construction without requiring extensive alterations thereto, and that the improved signal while being simple in construction, easily operated and durable, will efficiently acquaint pedestrians or approaching motorists of the intention of the motorist of the car equipped with the signals thereby eliminating not only accidents, but confusion at street intersections.

It is, of course, to be understood that the invention may be constructed in other manners and the parts associated in different relations and, therefore, I do not desire to be limited in any manner except as set forth in the claims hereunto appended.

Having thus described my invention what I claim is:

1. In combination with a motor vehicle head light housing structure, a bracket at one side of the housing having spaced arms, a rotatable shaft supported by the housing structure and bracket, an openings on one end of the shaft positioned between said arms a signal member connected to the other end of the shaft and normally lying in a horizontal plane upon the housing structure, a reciprocating rack having cooperative engagement with the opening, a rod having loose connection with the rack, a handle at the other end of the rod for imparting movement thereto and impart movement to the shaft thru actuation of the rack for moving the signal member to a vertical position above the head light housing structure or into the position aligning with the housing structure.

2. In combination a vehicle headlight housing structure, a rotatable shaft mounted thereon, a signal member attached to the shaft for movement in an arcuate path and normally positioned in a horizontal plane upon the housing structure and means for imparting movement to the shaft whereby to position the signal member in a vertical plane above the housing structure or in a position aligning with the housing structure.

In testimony whereof I affix my signature.

CHARLES WEBER.